US012427635B2

(12) United States Patent
Spampatti et al.

(10) Patent No.: US 12,427,635 B2
(45) Date of Patent: Sep. 30, 2025

(54) DEVICE FOR NAILING CAST IN PLACE ANCHORS

(71) Applicant: Hilti Aktiengesellschaft, Schaan (LI)

(72) Inventors: Matteo Spampatti, Buchs (CH); Achim Hassler, Eschen (LI); Michael Ziltener, Siebnen (CH); Jann Schraner, Heerbrugg (CH)

(73) Assignee: Hilti Aktiengesellschaft, Schaan (LI)

( * ) Notice: Subject to any disclaimer, the term of this patent is extended or adjusted under 35 U.S.C. 154(b) by 45 days.

(21) Appl. No.: 18/559,981

(22) PCT Filed: Apr. 29, 2022

(86) PCT No.: PCT/EP2022/061436
§ 371 (c)(1),
(2) Date: Nov. 9, 2023

(87) PCT Pub. No.: WO2022/238142
PCT Pub. Date: Nov. 17, 2022

(65) Prior Publication Data

US 2024/0238953 A1 Jul. 18, 2024

(30) Foreign Application Priority Data

May 10, 2021 (EP) .................................... 21172936

(51) Int. Cl.
*B25C 1/04* (2006.01)
*B25C 1/18* (2006.01)

(52) U.S. Cl.
CPC .............. *B25C 1/047* (2013.01); *B25C 1/188* (2013.01)

(58) Field of Classification Search
CPC ........... B25C 1/047; B25C 1/188; B25C 7/00; B25C 1/00; B25C 1/184; B25C 1/001;
(Continued)

(56) References Cited

U.S. PATENT DOCUMENTS 4,519,536 A 5/1985 Steigauf
2001/0025871 A1 10/2001 Losada
(Continued)

FOREIGN PATENT DOCUMENTS

AU 2004208650 A1 3/2005
JP 60-165174 U 11/1985
(Continued)

OTHER PUBLICATIONS

International Search Report (PCT/ISA/210) issued in PCT Application No. PCT/EP2022/061436 dated Sep. 5, 2022 (3 pages).

*Primary Examiner* — Veronica Martin
(74) *Attorney, Agent, or Firm* — Crowell & Moring LLP

(57) ABSTRACT

A device for nailing cast in place anchors includes a housing, which has an anchor receptacle for receiving a cast in place anchor, a nail gun abutment for abutting against a nail gun, and a ram, which extends into the housing towards the anchor receptacle and which is axially displaceable with respect to the housing. The ram has a striking surface facing the anchor receptacle for striking the cast in place anchor disposed in the anchor receptacle. The ram further has a striker abutment for abutting against a striker of the nail gun that is positioned at the nail gun abutment.

18 Claims, 6 Drawing Sheets

(58) Field of Classification Search
CPC ......... B25C 1/005; B25C 1/006; B25C 1/008; B25C 1/02; B25C 1/04; B25C 1/14; B25B 21/002; B25B 23/045; B25B 21/007; B25B 23/0035; B25B 23/005; B25B 23/04; B25B 23/06
See application file for complete search history.

(56) References Cited

U.S. PATENT DOCUMENTS

| | | | |
|---|---|---|---|
| 2006/0137285 A1 | 6/2006 | Brown | |
| 2018/0001461 A1* | 1/2018 | Pedicini | B25C 1/06 |
| 2019/0076999 A1* | 3/2019 | Yao | B25B 23/045 |
| 2019/0366518 A1 | 12/2019 | Tillinghast et al. | |
| 2020/0147765 A1 | 5/2020 | Irwin et al. | |
| 2021/0237244 A1* | 8/2021 | Bruggmueller | H02K 41/00 |
| 2021/0245343 A1 | 8/2021 | Spampatti | |

FOREIGN PATENT DOCUMENTS

| | | |
|---|---|---|
| JP | 61-41708 U | 3/1986 |
| JP | 61-57733 A | 3/1986 |
| JP | 61-181676 U | 11/1986 |
| JP | 62-19301 U | 2/1987 |
| JP | 62-113988 U | 7/1987 |
| JP | 63-182880 U | 11/1988 |
| JP | 64-49534 U | 3/1989 |
| JP | 5-49274 U | 6/1993 |
| JP | 2000-326258 A | 11/2000 |
| JP | 2004-181592 A | 7/2004 |
| WO | WO 2020/007706 A1 | 1/2020 |

* cited by examiner

DEVICE FOR NAILING CAST IN PLACE ANCHORS

BACKGROUND AND SUMMARY OF THE INVENTION

The invention relates to a device for nailing cast in place anchors, in particular to a shuttering.

Cast in place anchors are intended to be cast into concrete, and to provide an anchor point for a rod once the cast concrete has hardened. Some types of cast in place anchors, an example of which is shown in US 2006137285 A1, are intended to be nailed to a wooden shuttering before the concrete is cast so as to position the anchor with respect to the concrete body.

Nailing of a cast in place anchor to a wooden shuttering can, in a simple embodiment, be achieved by using a conventional manual hammer. JP 2000326258 A2 describes a pneumatic hammer tool for installing cast in place anchors. Purpose-built manual hammer tools for installing cast in place anchors are known from WO 20007706 A1, JP S6157733 A, JP S60165174 U, JP S6141708 U, JP S61181676 U, JP S6219301 U, JP S62113988 U, JP 6449534 U1, US 2006137285 A1, AU 2004208650 A1, and JP S63182880 U.

JP H0549274 U describes a hammer-like tool for remotely radially expanding an anchor.

JP 2004181592 A discloses a nail driving hammer.

It is an object of the invention to provide means which allow nailing cast in place anchors to a shuttering, in particular wood shuttering, in a particularly easy, reliable, fast and versatile manner.

A device for nailing cast in place anchors, in particular to a shuttering, is provided, the device comprising:

- a housing, which has an anchor receptacle for receiving a cast in place anchor,
- a nail gun abutment for abutting against a nail gun, and
- a ram, which extends into the housing towards the anchor receptacle, and which is axially displaceable with respect to the housing, wherein the ram has a striking surface facing the anchor receptacle for striking the cast in place anchor disposed in the anchor receptacle, and wherein the ram further has a striker abutment for abutting against a striker of the nail gun that is positioned at the nail gun abutment.

Accordingly, the device provides an energy transfer mechanism, which transfers hammer energy from the nail gun as an energy source to the cast in place anchor, so as to hammer the cast in place anchor into a shuttering, which can in particular be a wood form shuttering. The ram provides a second accelerated mass, which is actuated by the striker, wherein the striker provides a first accelerated mass.

Cast in place anchors are anchors that are intended to be cast into concrete before the concrete hardens. In particular, a cast in place anchor might have at least one rod retainer for engaging a rod, and at least one nail for penetrating a shuttering, in particular a wood shuttering, so as to fix the rod retainer to the shuttering before the concrete is cast. The rod retainer might have at least on mating thread for engaging a correspondingly threaded rod. Alternatively or additionally, the rod retainer might have a quick lock mechanism that allows the rod to be axially pushed into the rod retainer, but prevents axial withdrawal of the rod from the rod retainer. Such a quick lock mechanism might for example include wedge segments that engage the rod and/or it might include spring elements. The at least one nail could for example have a generally circular cross section, but could also have an elongate, blade-like cross-section. The at least one nail has at least one tip that is able to penetrate the shuttering when hammer blows are imparted on the nail. The at least one cast in place anchor might also have a head, connected to the rod retainer, for anchoring the cast in place anchor within the concrete, in particular if the rod retainer has a sleeve-like outer contour. In a particularly preferred embodiment, the cast in place anchor comprises a metallic rod retainer, a metallic head attached thereto, and a plastic nail holder, in which the rod retainer is embedded, and which holds a plurality of nails, preferably three of them, for penetrating a wood shuttering so as to fix the rod retainer to the shuttering. The tip of the at least one nail might project from the cast in place anchor, or it might be countersunk, before the anchor is nailed to the shuttering.

The housing of the device for nailing cast in place anchors at least partly surrounds the anchor receptacle and/or the ram. The housing could for example include plastic sections and/or metal sections. The cast in place anchor can be inserted into the anchor receptacle. When the cast in place anchor is disposed within the anchor receptacle, the cast in place anchor might be completely embedded in the housing (flush or countersunk), or it might stick out of the housing. In order to temporarily fix the cast in place anchor in the anchor receptacle, at least one snap element or other locking elements might be provided. Advantageously, the housing is narrow in the vicinity of the anchor receptacle in order to provide sufficient clearance to access tight spaces. Communication items, such as reflectors or transducers, for communicating with layout tools or measurement devices (e.g., total stations), might be provided on the device. A holder for a tablet computer might also be provided on the device.

The nail gun abutment provides an interface for connecting the device to a nail gun. In particular, the nail gun abutment might have at least one connector, such as a connector clip or a connector tab, for, preferably releasably, but alternatively also permanently, fixing the nail gun abutment to the nail gun. The nail gun abutment is intended to abut against the nail gun, in particular against the housing of the nail gun, so that when the nail gun (in particular its housing) is displaced, in particular axially forwardly, the nail gun abutment follows this movement due to geometric interlock between the nail gun (in particular its housing) and the nail gun abutment.

The nail gun might be for example gas actuated, powder actuated or pneumatically actuated. Preferably, it is battery actuated.

The ram is intended to transfer energy from the striker of the nail gun to the cast in place anchor, in particular to the at least one nail thereof. Preferably, the ram consists, at least partly, of a metal material. The ram can be axially guided at the housing of the device. In particular, the ram can be axially displaceable with respect to the nail gun abutment. In particular, the striking surface is intended for striking the at least one nail of the cast in place anchor, directly or also indirectly, for example via the head of the cast in place anchor. The striking surface might be flat or also non-flat, in particular in order to correspond to the geometry of the cast in place anchor. The striker abutment is intended to be located face-to-face with respect to the striker, so that the striker hits the striker abutment when the nail gun is fired. In particular, the striker abutment can be intended to be inserted into a muzzle of the nail gun. In particular, the striker and the ram are arranged coaxially when the device is connected to the nail gun.

Throughout this document—wherever the terms “axially”, “longitudinally”, “radially” and “circumferentially” are used, they can refer, in particular, to the longitudinal axis of the ram.

It is particularly preferred that the striking surface is disposed at a proximal end of the ram and the striker abutment is disposed at a distal end of the ram, wherein the proximal end of the ram and the distal end of the ram, respectively, are opposite ends of the ram. This can allow to keep the ram particularly short and can thus provide a particularly compact device.

According to a preferred embodiment, the device comprises a ram return spring, which rests on the ram, for biasing the ram axially away from the anchor receptacle and/or towards the striker. The ram return spring can provide that the ram rests on the striker in a particularly easy and reliable manner, thereby providing particularly efficient energy transfer. The ram return spring can consist of a plurality of separate spring elements, or it may comprise a single spring element only.

Advantageously, the device comprises an unlocking pushrod, which is axially displaceable with respect to the housing and with respect to the nail gun abutment, wherein the unlocking pushrod has an anchor probe surface located at the anchor receptacle and a lock abutment for abutting against a proximity plunger of the nail gun. Such an unlocking pushrod allows probing for the presence of an anchor within the anchor receptacle in a particularly efficient manner. Depressing of the proximity plunger can unlock a lock provided in the nail gun, which when locked prevents the nail gun from being fired. Accordingly, a cast in place anchor located within the anchor receptacle might act against the anchor probe surface of the unlocking pushrod so as to displace the unlocking pushrod, causing the lock abutment of the unlocking pushrod to act against the proximity plunger of the lock provided in the nail gun. The unlocking pushrod might be a simple bar, but it might also have more complex shapes. In particular, the unlocking pushrod can extend parallel to the ram. The unlocking pushrod is preferably located within the housing at least in parts. The lock provided in the nail gun can prevent firing of the nail gun when the anchor receptacle is empty. The anchor probe surface can be a single continuous surface, but it can also consist of at least two separate partial surfaces. These partial surfaces might, for example, be formed at the tips of anchor probe pins. The unlocking pushrod and the ram are preferably arranged coaxially, at least in regions.

Preferably, the anchor probe surface is disposed at a proximal end of the unlocking pushrod and the lock abutment is disposed at a distal end of the unlocking pushrod, wherein the proximal end of the unlocking pushrod and the distal end of the unlocking pushrod, respectively, are opposite ends of the unlocking pushrod. This can allow to keep the unlocking pushrod particularly short and can thus provide a particularly compact device.

As already hinted at above, the unlocking pushrod can advantageously comprise at least one anchor probe pin, wherein the anchor probe surface is arranged at the at least one anchor probe pin, more preferably at the tip thereof. Preferably, the unlocking pushrod can comprise a plurality (e.g., two) anchor probe pins. In this case, each of the anchor probe pins can comprise a partial surface of the anchor probe surface. Preferably, the at least one anchor probe pin penetrates the striking surface of the ram, which can provide a particular compact and/or robust device. Preferentially, the ram can form a guide for the at least one anchor probe pin.

Advantageously, the unlocking pushrod comprises at least one tube that surrounds the ram. This can provide a particular compact device.

It is particularly preferred that the unlocking pushrod has at least one guide sleeve for guiding the ram. This can keep the ram straight and prevent it from buckling as it is driven by the nail gun, in a particularly easy and reliable manner. The at least one guide sleeve can, for example, be a proximal sleeve or/and a distal sleeve.

The ram return spring can, advantageously, rest on the unlocking pushrod, in particular at a proximate end of the ram return spring. This can further facilitate the design of the device.

It is particularly preferred that the nail gun abutment can be axially advanced towards the housing. Advancing the nail gun abutment towards the housing can operate the unlocking pushrod for probing for the presence of an anchor within the anchor receptacle in a particularly easy manner. Moreover, a particularly compact device can be obtained. For example, the nail gun abutment and the housing can form a telescope arrangement, which might additionally guide the nail gun abutment as it is axially advanced towards the housing.

Preferably, the device can further comprise an abutment return spring for pushing the nail gun abutment away from the housing. Accordingly, the nail gun abutment is spring mounted on the housing. The abutment return spring is compressed when the nail gun abutment is advanced towards the housing, so as to return the nail gun abutment to its original, idle position when the nail gun abutment is released. This can further facilitate handling. The abutment return spring can consist of a plurality of separate spring elements, or it may comprise a single spring element only.

Advantageously, the ram has a mass ranging from 100 g to 750 g. Thus, the ram has a weight that is greater than or equal to 100 g and smaller than or equal to 750 g. This can be advantageous in view of energy transfer and robustness.

The device can, in another preferred embodiment, comprise a feed tube for feeding cast in place anchors into the anchor receptacle. In particular, the feed tube can be connected to the housing. The feed tube can further facilitate operation of the device. The feed tube might have an anchor insertion opening that can, for example, be located in the vicinity of the nail gun abutment, and an output opening that is located adjacent to the anchor receptacle. In particular, the feed tube might extend generally parallel to the ram. In operation, cast in place anchors might be dropped into the feed tube, and the feed tube guides the cast in place anchors into the anchor receptacle. Additionally or alternatively, the device might comprise a magazine for accommodating a plurality of cast in place anchors to be successively fed into the anchor receptacle. Accordingly, the magazine can take up a plurality of cast in place anchors, and the device is configured to feed these cast in place anchors successively into the anchor receptacle.

At least one guide ring (preferably two of them) may be advantageously arranged at the nail gun abutment, for axially guiding the nail gun abutment at the feed tube, wherein the feed tube extends through the guide ring. This can further improve reliability.

The invention also relates to a system comprising a device as described and a nail gun having a striker, wherein the nail gun is positioned at the nail gun abutment so that the striker faces the striker abutment of the ram. In particular, the nail gun, more particularly the housing of the nail gun, abuts against the nail gun abutment. Preferably, a proximity plunger of the nail gun faces the lock abutment of the unlocking pushrod. Accordingly, the nail gun is arranged with respect to the device in its intended operation position.

Preferentially, the ram return spring pushes the ram into contact with the striker, which is the intended configuration. Preferentially, constant contact between the striker and the ram is provided by the ram return spring.

Advantageously, the striker has a mass ranging from 50 g to 250 g, i.e., the mass of the striker is greater than or equal to 50 g and smaller than or equal to 250 g. This can be advantageous in view of energy transfer and robustness.

The nail gun is preferably configured to provide a setting energy of 50 Joules or more on the striker, which can allow particularly efficient installation of usual cast in place anchors.

The system may further comprise a cast in place anchor, which is positioned within the anchor receptacle. Accordingly, the cast in place anchor is positioned as intended, awaiting to be installed by means of the device and the nail gun. The distance between the striking surface and the cast in place anchor positioned within the anchor receptacle can preferentially range from 10 mm to 100 mm, when the cast in place anchor is positioned as intended awaiting to be installed by means of the device and the nail gun, i.e., when the system is in its idle position.

Features that are described here in connection with the device can also be used in connection with the system and features that are described here in connection with the system can also be used in connection with the device.

The invention is explained in greater detail below with reference to preferred exemplary embodiments, which are depicted schematically in the accompanying drawings. Individual features of the exemplary embodiments presented below can be implemented either individually or in any combination within the scope of the present invention.

DETAILED DESCRIPTION OF THE DRAWINGS

Figure 1:
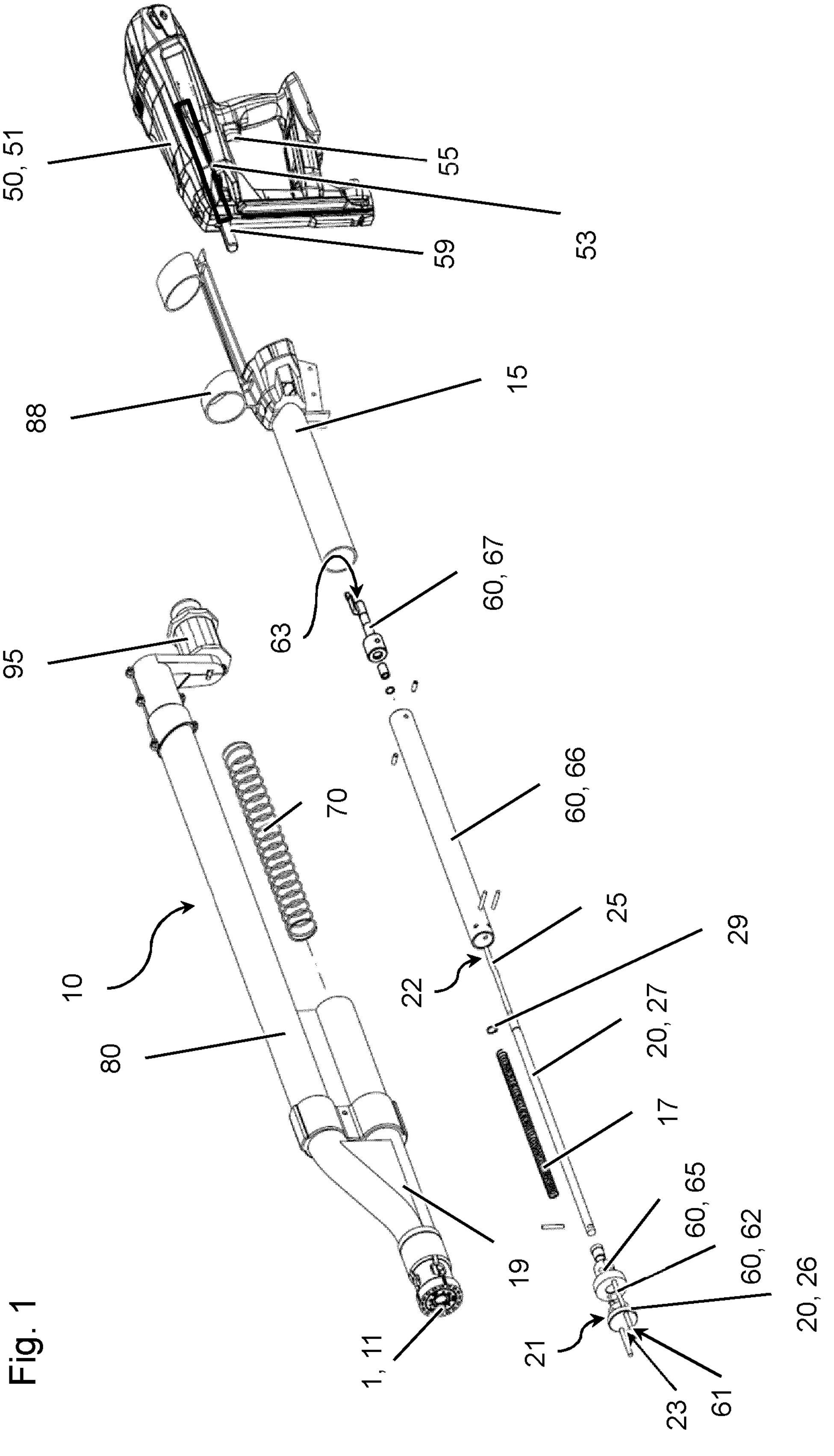
FIG. 1 is an exploded view of a system including a nail gun and a device for nailing cast in place anchors to a shuttering, and of a cast in place anchor.

The figures show an example of a system which comprises, amongst others, a nail gun 50 having a housing 51 and a striker 53 (shown only highly schematically), wherein the striker 53 can be axially fired (i.e., moved explosively axially forwardly) with respect to the housing 51. In the present embodiment, the striker 53 is battery actuated, but this is an example only and other actuation modes can also be envisaged. The nail gun 50 has a trigger 55 which causes the striker 53 to be fired when the trigger 55 is pressed. The nail gun 50 further has a lock mechanism comprising a proximity plunger 59, wherein the lock mechanism prevents the striker 53 from being fired, even when the trigger 55 is pressed, until the proximity plunger 59 is depressed into the housing 51. The lock can thus ensure that the striker 53 is not fired before the striker is located proximate to a working surface. In the present case, the proximity plunger 59 is a sleeve, wherein the striker 53 projects into the proximity plunger 59, at least when the striker 53 is fired.

The system further comprises a device 10 for nailing cast in place anchors 1 to a shuttering. The device 10 is mechanically connected to the nail gun 50 and comprises a nail gun abutment 15 and a housing 19, which is mechanically connected to the nail gun abutment 15.

The housing 19 is generally tubular and has an anchor receptacle 11, in which a cast in place anchor 1 can be positioned.

The nail gun abutment 15 is generally tubular. At least one connector for permanently or, advantageously, temporarily connecting the nail gun abutment 15 to the nail gun 50 is provided on the nail gun abutment 15. This connector could for example include not shown snapping tabs.

The nail gun abutment 15 and the housing 19 are telescopically nested. In the shown embodiment, the nail gun abutment 15 is nested within the housing 19, but this is an example only, and an arrangement in which the housing 19 is nested within the nail gun abutment 15 is also feasible. The device 10 further comprises an abutment return spring 70. The abutment return spring 70 is a compression spring and can be in particular a helical spring. The abutment return spring 70 is arranged between the housing 19 and the nail gun abutment 15 so as to bias the nail gun abutment 15 away from the housing 19. Accordingly, the abutment return spring 70 rests on one side on the housing 19 and on the other side on the nail gun abutment 15, and the abutment return spring 70 tends to telescope out the arrangement consisting of the nail gun abutment 15 and the housing 19.

The device 10 further comprises an elongate ram 20, which extends into the housing 19 and into the nail gun abutment 15, and which is axially displaceable with respect to the housing 19 and with respect to the nail gun abutment 15. The ram 20 has a proximal end 21, which is located within the housing 19, namely adjacent to the anchor receptacle 11, and a distal end 22, which is located remote from the anchor receptacle 11, wherein the proximal end 21 and the distal end 22 are opposite ends of the ram 20. The longitudinal axis of the ram 20 extends through the proximal end 21 and through the distal end 22. The distal end 22 of the ram is arranged within the nail gun abutment 15.

The ram 20 has a striking surface 23 which is intended for striking the cast in place anchor 1 that is arranged within the anchor receptacle 11, so as to nail the cast in place anchor 1 into a shuttering, in particular a wood shuttering, located adjacent to the anchor receptacle 11. The striking surface 23 forms an end face of the ram 20 and is located at the proximal end 21 of the ram 20. The striking surface 23 faces the anchor receptacle 11 and is located adjacent to the anchor receptacle 11. In the present embodiment, the striking surface 23 is generally flat, since the corresponding hitting surface of the cast in place anchor 1 is correspondingly flat, but non-flat geometries of the striking surface 23 can also be envisaged.

The ram 20 moreover has a striker abutment 25, which is located at the distal end 22 of the ram 20. The striker abutment 25 points away from the anchor receptacle 11. When the device 10 is mounted on the nail gun 50 as intended, the striker abutment 25 faces the striker 53 of the nail gun 50 so that striker 53 can act against the striker abutment 25 to axially drive the ram 20 towards the anchor receptacle 11 when the striker 53 is fired. The ram 20 thus provides an energy transfer mechanism to transfer energy from the striker 53 to the cast in place anchor 1. In particular, the striker abutment 25 can be intended to be placed within the proximity plunger 59 of the nail gun 50, with the proximity plunger 59 being sleeve-like.

In the present embodiment, the ram 20 comprises a head piece 26, which forms the proximal end 21 of the ram, and on which the striking surface 23 is provided, and an elongate rear piece 27, which forms the distal end 22 of the ram 20, and on which the striker abutment 25 is provided. The head piece 26 and the rear piece 27 are non-monolithic with respect to one another, but mechanically fixed to one another. In the present embodiment, mechanical fixation is achieved by means of at least one transverse bolt, but other connections, such as threaded connections or others could also be envisaged.

The device 10 further comprises an unlocking pushrod 60, which extends essentially parallel to the ram 20, from the housing 19, in particular from the anchor receptacle 11 into the nail gun abutment 15. The unlocking pushrod 60 is axially displaceable with respect to the housing 19, with respect to the nail gun abutment 15 and with respect to the ram 20.

The unlocking pushrod 60 comprises an anchor probe surface 61, wherein the anchor probe surface 61 is disposed at a proximal end of the unlocking pushrod 60, wherein the anchor probe surface 61 is located adjacent to the anchor receptacle 11 and wherein the anchor probe surface 61 faces the anchor receptacle 11. The unlocking pushrod 60 further comprises a lock abutment 63, which is disposed at a distal end of the unlocking pushrod 60, and which faces away from the anchor receptacle 11. When the device 10 is mounted on a nail gun 50 as intended, the anchor probe surface 61 faces the proximity plunger 59 of the nail gun 50, so as to be able to depress the proximity plunger 59 so as to unlock the lock of the nail gun 50. The proximal end of the unlocking pushrod 60 and the distal end of the unlocking pushrod 60, respectively, are opposite ends of the unlocking pushrod 60.

In the present embodiment, the unlocking pushrod 60 comprises at least one elongate anchor probe pin 62 (namely two anchor probe pins, by way of example, in the shown embodiment), projecting at the proximal end of the unlocking pushrod 60. The anchor probe pin 62 penetrates the head piece 26 and the striking surface 23 of the ram 20 and projects towards the anchor receptacle 11. The anchor probe surface 61 is constituted by the end face of the at least one anchor probe pin 62.

In the present embodiment, the unlocking pushrod 60 further comprises a proximal sleeve 65, which adjoins the at least one anchor probe pin 62, an intermediate tube 66, which adjoins the proximal sleeve 65, and a distal sleeve 67, which adjoins the intermediate tube 66. The intermediate tube 66 thus extends in the middle of the unlocking pushrod 60, i.e., between the proximal end and the distal end thereof and between the proximal sleeve 65 and the distal sleeve 67. The at least one anchor probe pin 62 projects from the proximal sleeve 65. The lock abutment 63 is provided on the distal sleeve 67. The proximal sleeve 65 is transverse bolted to the intermediate tube 66 and the intermediate tube 66 is transverse bolted to the distal sleeve 67.

The proximal sleeve 65, the intermediate tube 66 and the distal sleeve 67 each surround the ram 20. The proximal sleeve 65 and the distal sleeve 67 each form a guide sleeve for guiding the ram 20, thus supporting the ram 20 against radial buckling when the ram 20 is axially driven by the nail gun 50.

The abutment return spring 70 surrounds both the ram 20, in particular the rear piece 27 thereof, and the unlocking pushrod 60, in particular the intermediate tube 66 and/or the distal sleeve 67 thereof.

The device further comprises a ram return spring 17, which biases the ram 20 away from the anchor receptacle 11 towards the striker 53. Due to the action of the ram return spring 17, the striking surface 23 is spaced from the cast in place anchor 1 that is held within the anchor receptacle 11 when the device 10 is in an idle state (shown in FIG. 2) before the nail gun 50 is fired, wherein the spacing is preferably in a range from 10 mm to 100 mm. Additionally or alternatively, due to the action of the ram return spring 17, the ram 20 (with its striker abutment 25) may abut against the striker 53 in the idle state before the nail gun 50 is fired.

On its one (proximal) end, the ram return spring 17 rests on the unlocking pushrod 60, in particular on the proximal sleeve 65 thereof, and on its other (distal) end, the ram return spring 17 rests on the ram 20, for example on a shoulder ring 29 provided at the rear piece 27 of the ram 20. In the present embodiment, the ram return spring 17 is, by way of example, a coil spring that surrounds the ram 20. The ram return spring 17 extends within the unlocking pushrod 60, namely within the intermediate tube 66 thereof.

The device 10 moreover has a feed tube 80 for feeding cast in place anchors 1 into the anchor receptacle 11. In the present embodiment, the feed tube 80 extends parallel to the ram 20, but other orientations could also be envisaged. Two guide rings 88 are provided on the nail gun abutment 15, wherein the feed tube 80 extends through the guide rings 88. By means of the guide rings 88, the nail gun abutment 15 is axially guided on the feed tube 80 and thus indirectly axially guided on the housing 19, which is connected to the feed tube 80.

The device 10 further comprises a reflector prism 95, which is, in the present embodiment, connected to the feed tube 80 by way of example.

Figure 2:
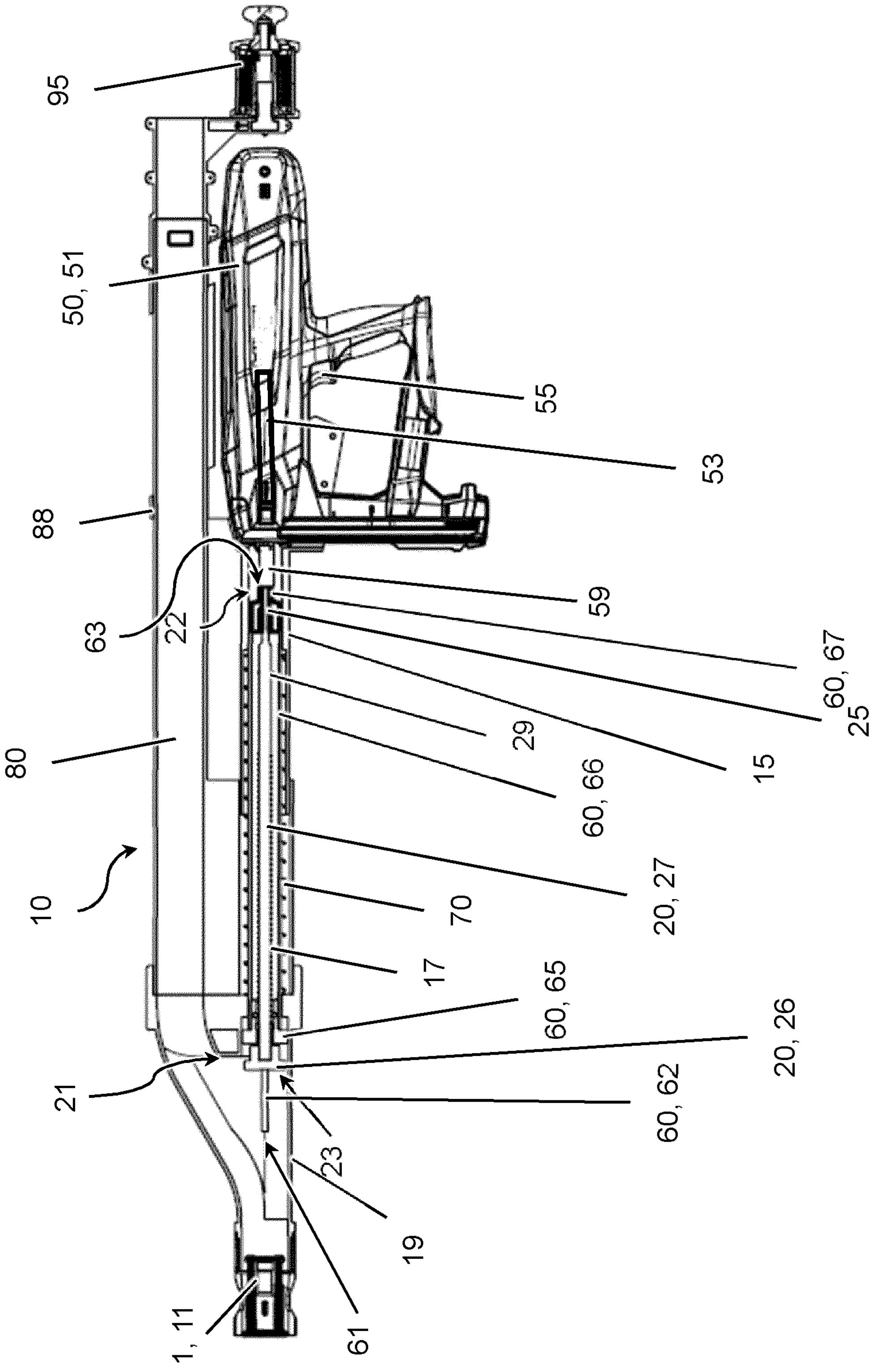
FIGS. 2 to 5 show, in partly longitudinally sectional view, subsequent stages of the system in intended use.

In use, the nail gun 50 is connected to the nail gun abutment 15 of the device 10. A cast in place anchor 1 is fed into the anchor receptacle 11, in particular via the feed tube 80, and the device 10 is placed at a working surface, which is in particular a surface of a shuttering (e.g., a wood shuttering), so that anchor receptacle 11 and the cast in place anchor 1 arranged within the anchor receptacle 11 are located adjacent to the working surface. The resulting configuration is shown in FIG. 2. Intended positioning of the device 10 on the working surface could be assisted by the reflector prism 95.

The nail gun 50 is then pushed axially towards the working surface and towards the housing 19 resting on the working surface. This will cause the nail gun abutment 15 that abuts against the housing 51 of the nail gun 50 to approach the working surface and further cause the arrangement consisting of the nail gun abutment 15 and the housing 19 to telescope in, thereby compressing the abutment return spring 70. In the process of telescoping-in, the nail gun abutment 15 is guided on the feed tube 80 by means of the guide rings 88.

Figure 3:
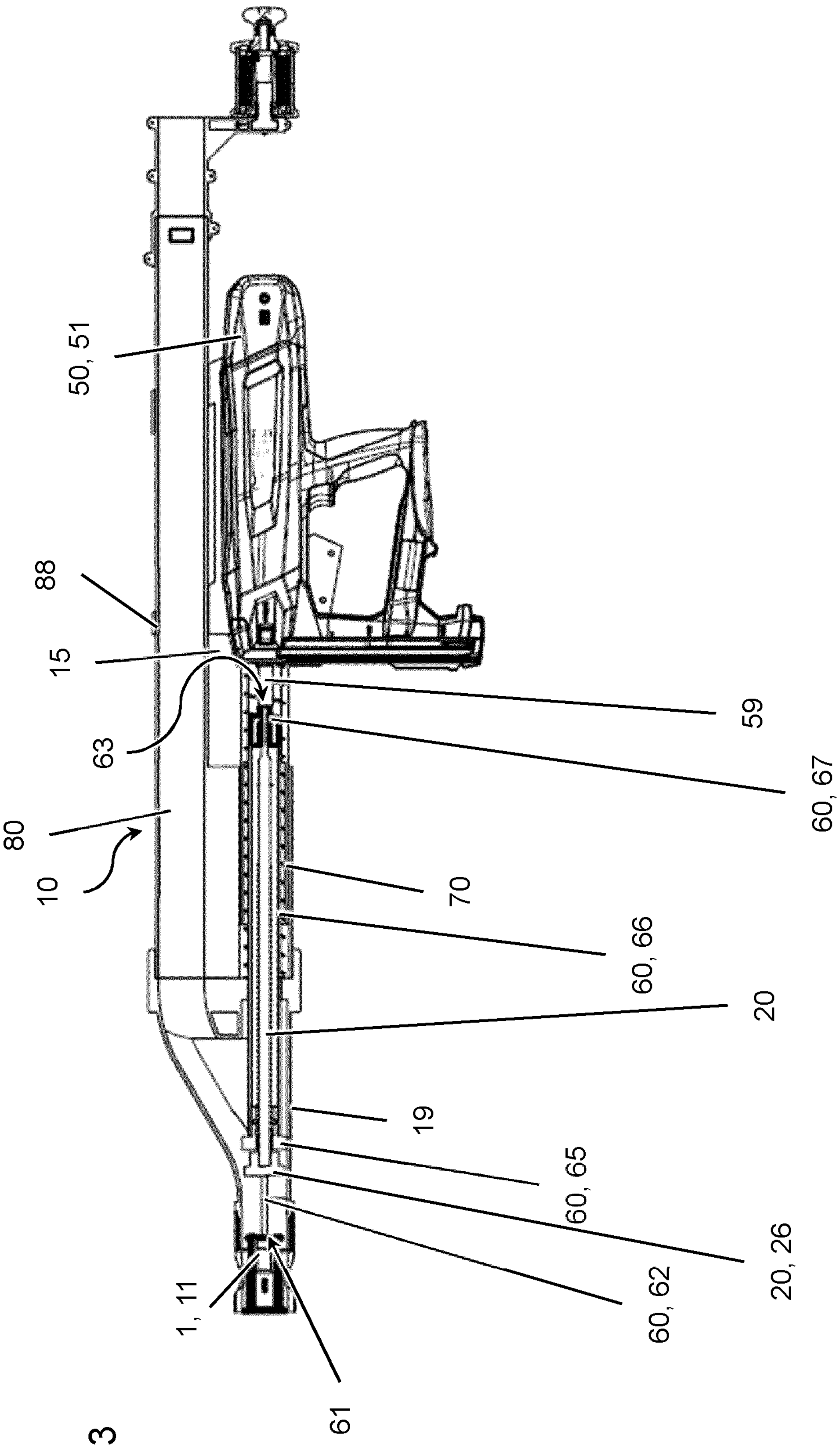

The nail gun abutment 15, together with the nail gun 50 resting thereon, approaching the housing 19 with the cast in place anchor 1 located therein will cause the unlocking pushrod 60 to become confined between the cast in place anchor 1 located in the anchor receptacle 11 on the one side and the proximity plunger 59 of the nail gun 50 on the other side. Eventually, the unlocking pushrod 60 abutting on the cast in place anchor 1 at the anchor probe surface 61 will thus depress the proximity plunger 59 at the lock abutment 63, so that the lock mechanism of the nail gun 50 becomes unlocked. The resulting configuration is shown in FIG. 3.

Figure 4:
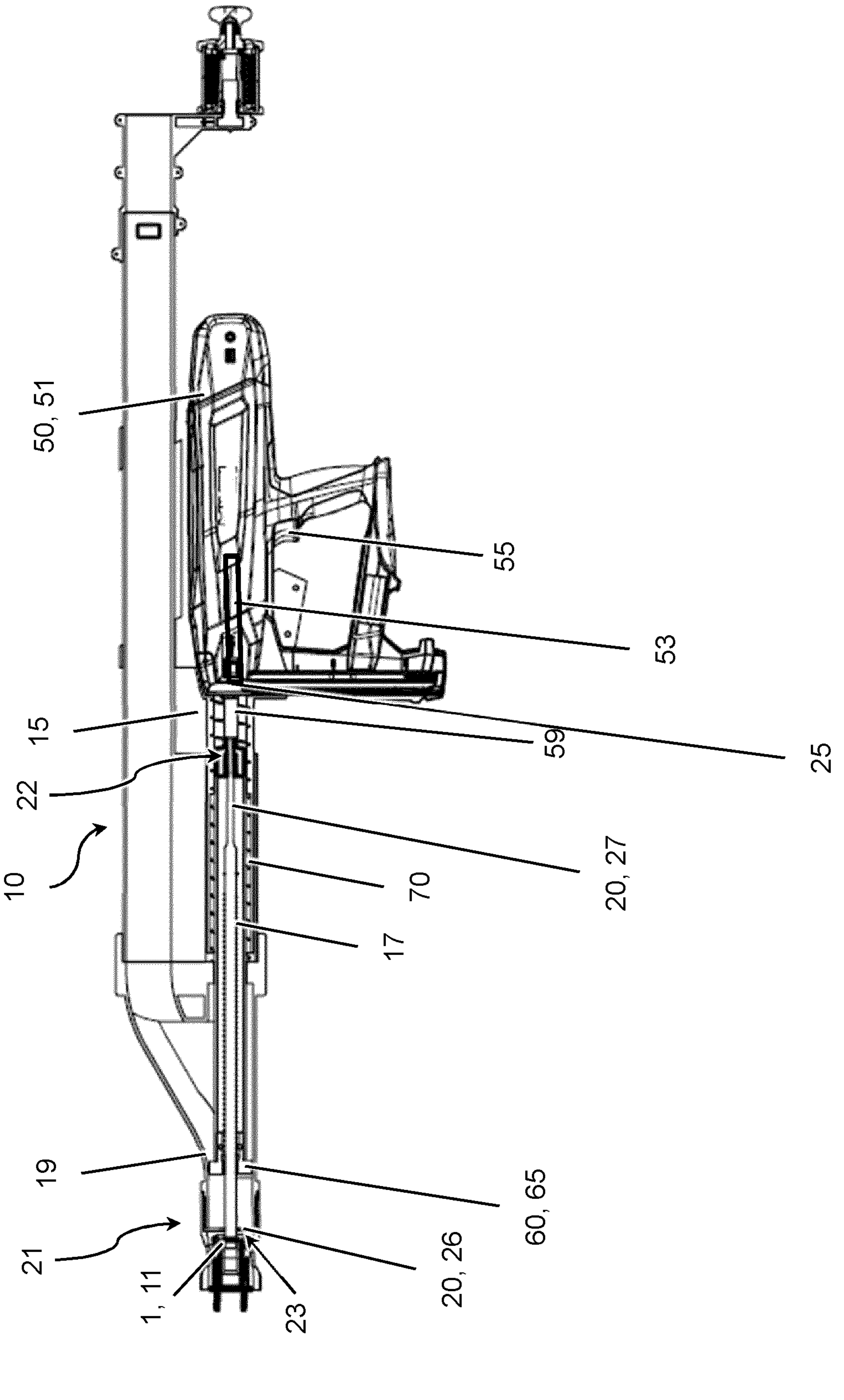

Subsequently, the trigger 55 is operated and the—now unlocked—striker 53 of the nail gun is thereby caused to be fired, i.e., to be explosively axially advanced towards the ram 20. This causes the striker 53 to hit the striker abutment 25 of the ram 20, which causes the ram 20 to be pushed axially towards the cast in place anchor 1 located in the anchor receptacle 11. Axial advancement of the ram 20 will eventually cause the striking surface 23 of the ram 20 to hit the cast in place anchor 1, which will hammer the cast in place anchor 1 into the working surface. The resulting configuration is shown in FIG. 4.

Figure 5:
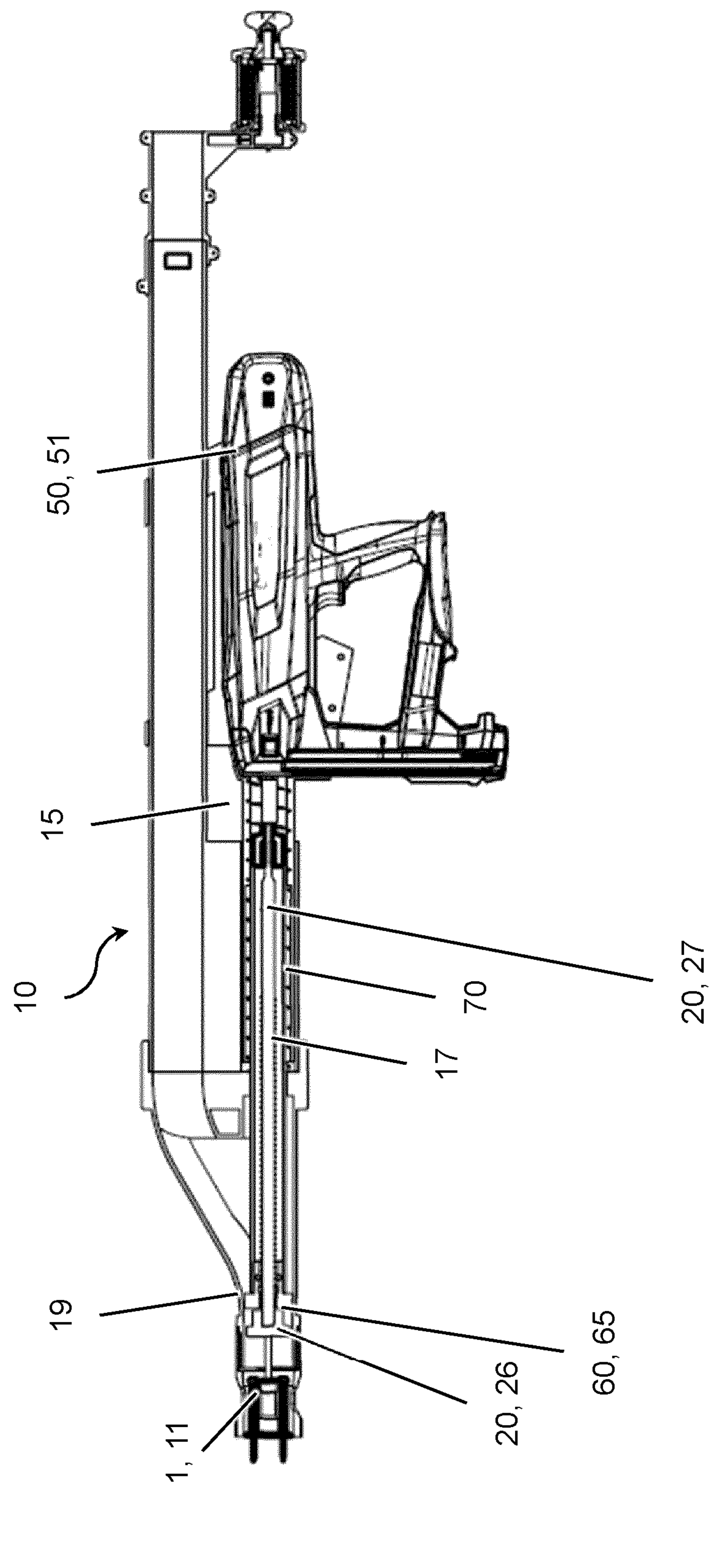
Figure 6:
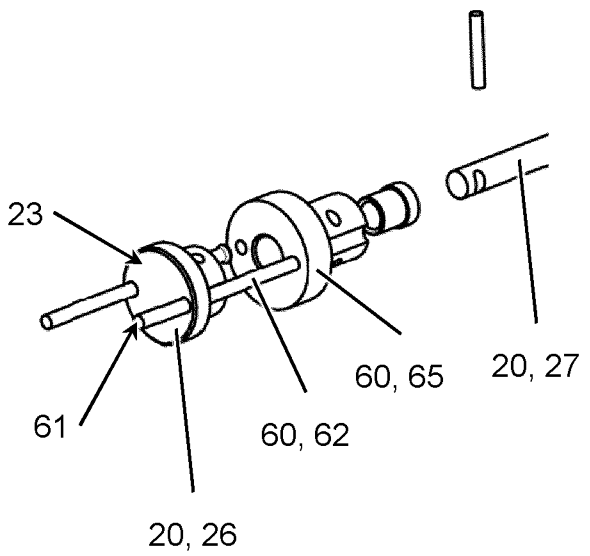
FIG. 6 is a detail of the view of FIG. 1, showing the proximal ends of the ram and of the unlocking pushrod in detail.

After firing of the striker 53 and nailing-in of the cast in place anchor 1, the ram return spring 17 returns the ram 20 back into its original, idle position. The resulting configuration is shown in FIG. 5.

Finally, the nail gun 50 is released, and the abutment return spring 70 causes the arrangement consisting of the nail gun abutment 15 and the housing 19 to telescope out, thereby bringing the device 10 back into its idle position shown in FIG. 2.

The invention claimed is:

1. A device (10) for nailing cast in place anchors (1), comprising:

a housing (19) which has an anchor receptacle (11) for receiving a cast in place anchor (1);

a nail gun abutment (15) for abutting against a nail gun (50);

a ram (20) which extends into the housing (19) towards the anchor receptacle (11) and which is axially displaceable with respect to the housing (19), wherein the ram (20) has a striking surface (23) facing the anchor receptacle (11) for striking a cast in place anchor (1) disposed in the anchor receptacle (11) and wherein the ram (20) has a striker abutment (25) for abutting against a striker (53) of the nail gun (50) that is positioned at the nail gun abutment (15); and an unlocking pushrod (60) which is axially displaceable with respect to the housing (19) and with respect to the nail gun abutment (15), wherein the unlocking pushrod (60) has an anchor probe surface (61) located at the anchor receptacle (11) and a lock abutment (63) for abutting against a proximity plunger (59) of the nail gun (50).

2. The device (10) according to claim 1, wherein the striking surface (23) is disposed at a proximal end (21) of the ram (20) and the striker abutment (25) is disposed at a distal end (22) of the ram (20) and wherein the proximal end (21) of the ram (20) and the distal end (22) of the ram (20), respectively, are opposite ends of the ram (20).

3. The device (10) according to a claim 1, further comprising a ram return spring (17) which rests on the ram (20), wherein the ram return spring (17) biases the ram (20) axially away from the anchor receptacle (11).

4. The device (10) according to claim 1, wherein the anchor probe surface (61) is disposed at a proximal end of the unlocking pushrod (60) and the lock abutment (63) is disposed at a distal end of the unlocking pushrod (60) and wherein the proximal end of the unlocking pushrod (60) and the distal end of the unlocking pushrod (60), respectively, are opposite ends of the unlocking pushrod (60).

5. The device (10) according to claim 1, wherein the unlocking pushrod (60) has at least one anchor probe pin (62) which penetrates the striking surface (23) of the ram (20) and wherein the anchor probe surface (61) is arranged at the at least one anchor probe pin (62).

6. The device (10) according to claim 1, wherein the unlocking pushrod (60) has at least one guide sleeve (65, 67) and wherein the ram (20) is guidable by the at least one guide sleeve (65, 67).

7. The device (10) according to claim 1, further comprising a ram return spring (17) which rests on the ram (20), wherein the ram return spring (17) biases the ram (20) axially away from the anchor receptacle (11) and wherein the ram return spring (17) rests on the unlocking pushrod (60).

8. The device (10) according to claim 1, wherein the nail gun abutment (15) is axially advanceable towards the housing (19).

9. The device (10) according to claim 1, further comprising an abutment return spring (70), wherein the nail gun abutment (15) is pushable away from the housing (19) by the abutment return spring (70).

10. The device (10) according to claim 1, wherein the ram (20) has a mass ranging from 100 g to 750 g.

11. The device (10) according to claim 1, further comprising a feed tube (80) for feeding cast in place anchors (1) into the anchor receptacle (11), wherein the feed tube (80) is connected to the housing (19).

12. A device (10) for nailing cast in place anchors (1), comprising:

a housing (19) which has an anchor receptacle (11) for receiving a cast in place anchor (1);

a nail gun abutment (15) for abutting against a nail gun (50);

a ram (20) which extends into the housing (19) towards the anchor receptacle (11) and which is axially displaceable with respect to the housing (19), wherein the ram (20) has a striking surface (23) facing the anchor receptacle (11) for striking a cast in place anchor (1) disposed in the anchor receptacle (11) and wherein the ram (20) has a striker abutment (25) for abutting against a striker (53) of the nail gun (50) that is positioned at the nail gun abutment (15);

a feed tube (80) for feeding cast in place anchors (1) into the anchor receptacle (11), wherein the feed tube (80) is connected to the housing (19); and at least one guide ring (88) that is arranged at the nail gun abutment (15) for axially guiding the nail gun abutment (15) at the feed tube (80), wherein the feed tube (80) extends through the guide ring (88).

13. A system, comprising:

the device (10) according to claim 1; and a nail gun (50) having a striker (53), wherein the nail gun (50) is positioned at the nail gun abutment (15) such that the striker (53) faces the striker abutment (25) of the ram (20).

14. The system according to claim 13, wherein the device further comprises a ram return spring (17) which rests on the ram (20), wherein the ram return spring (17) biases the ram (20) axially away from the anchor receptacle (11), and wherein the ram return spring (17) pushes the ram (20) into contact with the striker (53).

15. The system according to claim 13, wherein the striker (53) has a mass ranging from 50 g to 250 g.

16. The system according to claim 13, wherein the nail gun (50) is configured to provide a setting energy of 50 Joules or more on the striker (53).

17. The system according to claim 13, further comprising a cast in place anchor (1) which is positioned within the anchor receptacle (11).

18. The system according to claim 17, wherein a distance between the striking surface (23) and the cast in place anchor (1) positioned within the anchor receptacle (11) ranges from 10 mm to 100 mm.

* * * * *